US011881667B2

(12) United States Patent
Sato

(10) Patent No.: US 11,881,667 B2
(45) Date of Patent: Jan. 23, 2024

(54) TERMINAL-EQUIPPED ELECTRIC WIRE

(71) Applicant: Yazaki Corporation, Tokyo (JP)

(72) Inventor: Kei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 81 days.

(21) Appl. No.: 17/693,201

(22) Filed: Mar. 11, 2022

(65) Prior Publication Data

US 2022/0311152 A1 Sep. 29, 2022

(30) Foreign Application Priority Data

Mar. 23, 2021 (JP) ................................ 2021-048009

(51) Int. Cl.
*H01R 4/18* (2006.01)

(52) U.S. Cl.
CPC .................................... *H01R 4/185* (2013.01)

(58) Field of Classification Search
CPC ...................................................... H01R 4/185
USPC .......................................................... 439/877
See application file for complete search history.

(56) References Cited

U.S. PATENT DOCUMENTS 8,771,015 B2 * 7/2014 Inoue ....................... H01R 4/70
439/604
9,209,615 B2 * 12/2015 Ono ..................... H02G 15/046
2018/0375276 A1 12/2018 Onuma
2022/0115793 A1 4/2022 Kitamura et al.

FOREIGN PATENT DOCUMENTS

| | | | | | |
|---|---|---|---|---|---|
| DE | 102020204877 | A1 | * | 11/2020 | ............. H01R 4/185 |
| JP | 2009-129627 | A | | 6/2009 | |
| JP | 2014191951 | A | * | 10/2014 | |
| JP | 2014203725 | A | * | 10/2014 | |
| JP | 2014220097 | A | * | 11/2014 | ............... H01R 4/18 |
| JP | 2015041404 | A | * | 3/2015 | |
| JP | 2017-204444 | A | | 11/2017 | |
| JP | 2017199602 | A | * | 11/2017 | |
| JP | 2018-6205 | A | | 1/2018 | |
| JP | 2018-37252 | A | | 3/2018 | |
| JP | 2019-9027 | A | | 1/2019 | |
| JP | 2019-121425 | A | | 7/2019 | |
| WO | 2020/166110 | A1 | | 8/2020 | |

* cited by examiner

*Primary Examiner* — Peter G Leigh
(74) *Attorney, Agent, or Firm* — KENEALY VAIDYA LLP

(57) ABSTRACT

A terminal-equipped electric wire includes an electric wire, a terminal fitting, and a water-stopping member. The terminal fitting includes a bottom wall on which the electric wire end is placed, and a pair of core wire caulking pieces caulking and crimping a core wire exposed part in a state where a front end of the core wire exposed part protrudes, and the bottom wall includes a concave part that continues from a place facing the front end side of the core wire exposed part in the pair of core wire caulking pieces to the tip of a front end surface of the front end of the core wire exposed part, and receives the bottom wall side ranging from a place where the core wire exposed part is caulked and crimped by the end parts of the pair of core wire caulking pieces to the front end surface.

4 Claims, 4 Drawing Sheets

TERMINAL-EQUIPPED ELECTRIC WIRE

CROSS-REFERENCE TO RELATED APPLICATION(S)

The present application claims priority to and incorporates by reference the entire contents of Japanese Patent Application No. 2021-048009 filed in Japan on Mar. 23, 2021.

BACKGROUND OF THE INVENTION

1. Field of the Invention

The present invention relates to a terminal-equipped electric wire.

2. Description of the Related Art

In some of the conventional terminal-equipped electric wires, an end of the electric wire and a caulked and crimped part of a terminal fitting that is caulked and crimped to the end of the electric wire are with countermeasures against corrosion. For example, Japanese Patent Application Laid-open No. 2018-006205 discloses a technique of covering an exposed part of an end of an electric wire in a caulked and crimped part with a water-stopping member formed of curable resin from the outside together with the caulked and crimped part, so that the entry of liquid into a connection part between the end of the electric wire and the caulked and crimped part is suppressed. In another example, Japanese Patent Application Laid-open No. 2017-204444 discloses a technique of making a front end of a core wire exposed part at an end of an electric wire protrude from a caulked and crimped part and providing a narrow groove at a bottom wall of a terminal fitting on which the front end of the core wire exposed part is placed, so that liquid such as water is discharged along this narrow groove.

Incidentally, in the core wire exposed part, the crimping force applied from the caulked and crimped part causes the front end protruding from the caulked and crimped part to jump up in a direction opposite to the direction of the crimping force, for example. In the terminal-equipped electric wire, the curable resin in a liquid form is applied while the front end of the core wire exposed part jumps up; therefore, the water-stopping member becomes thinner in this jumping part of the core wire exposed part than in the periphery or the formation of the water-stopping member may fail in the jumping part. Accordingly, in the terminal-equipped electric wire, the durability of the water-stopping member in the jumping part of the core wire exposed part may deteriorate. On the other hand, when the conventional terminal-equipped electric wire having the narrow groove on the bottom wall of the terminal fitting does not have the water-stopping member that causes the inconvenience, the decrease in durability of the water-stopping member is no longer concerned. However, the narrow groove does not necessarily discharge all the liquid adhering to the end of the electric wire. Therefore, as the countermeasure against the corrosion, it is still effective to cover the connection part between the end of the electric wire and the caulked and crimped part with the water-stopping member to avoid the contact of the liquid such as water with this connection part.

SUMMARY OF THE INVENTION

In view of the above, it is an object of the present invention to provide a terminal-equipped electric wire that can obtain the anticorrosion performance with the excellent durability.

In order to solve the above mentioned problem and achieve the object, a terminal-equipped electric wire according to one aspect of the present invention includes an electric wire including a core wire formed of a plurality of element wires, and a cover that covers the core wire while exposing a core wire exposed part of the core wire at an electric wire end; a terminal fitting attached to the electric wire end; and a water-stopping member formed of a curable resin material and covering an exposed part of the electric wire end in the terminal fitting from outside together with the terminal fitting so as to suppress entry of liquid to a connection part between the electric wire end and the terminal fitting, wherein the terminal fitting includes a bottom wall on which the electric wire end is placed, and a pair of core wire caulking pieces rising from the bottom wall and caulking and crimping the core wire exposed part together with the bottom wall in a state where a front end of the core wire exposed part protrudes, and the bottom wall includes a concave part that continues from a place facing end parts of the pair of core wire caulking pieces on the front end side of the core wire exposed part to a front end surface of the front end of the core wire exposed part, and receives the bottom wall side ranging from a place at which the core wire exposed part is caulked and crimped by the end parts of the pair of core wire caulking pieces to the front end surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a terminal-equipped electric wire according to the present invention is hereinafter described in detail with reference to drawings. Note that the present invention is not limited by the embodiment.

Embodiment

One embodiment of the terminal-equipped electric wire according to the present invention is described with reference to FIG. 1 to FIG. 7.

Figure 1:
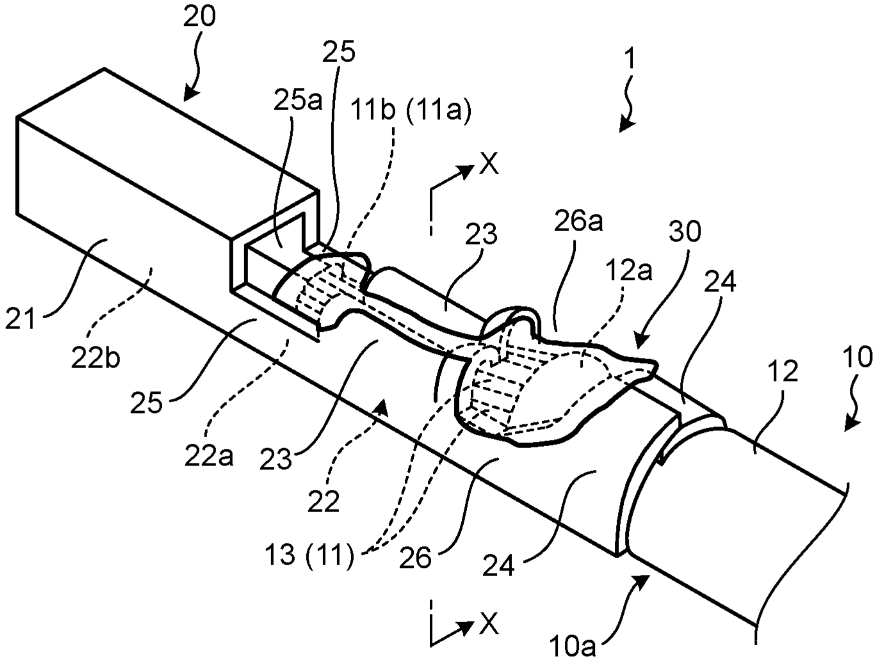
FIG. 1 is a perspective diagram illustrating a terminal-equipped electric wire according to one embodiment.
Figure 2:
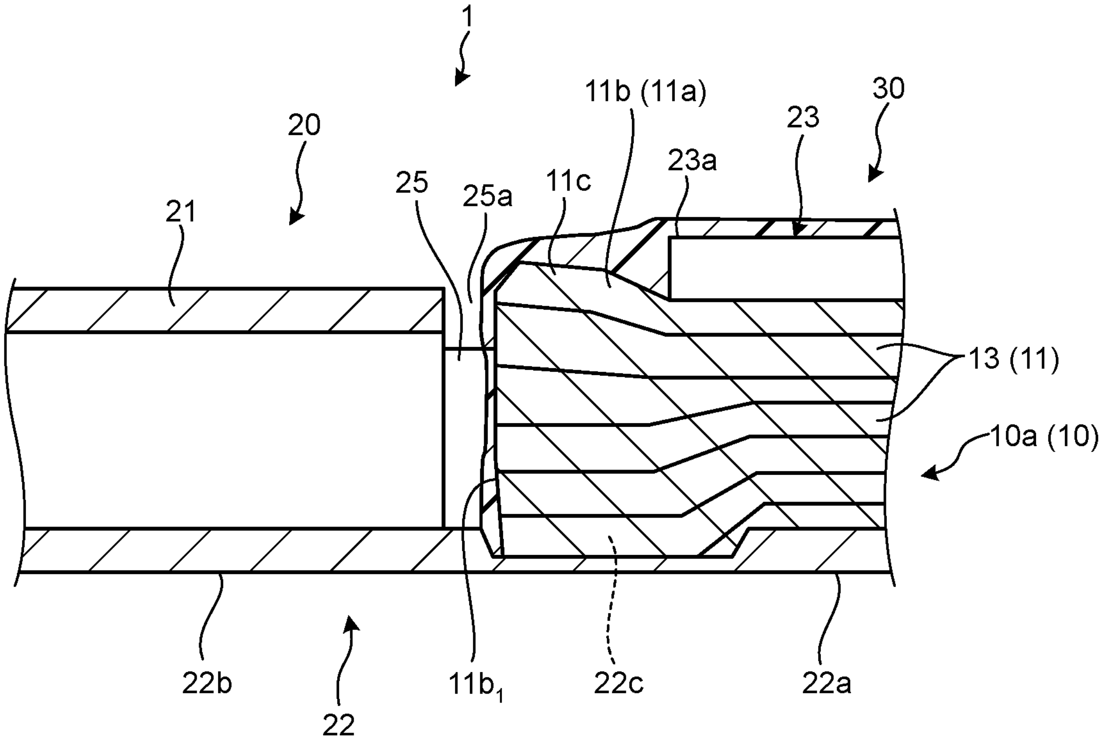
FIG. 2 is a partial magnified diagram of a cross section taken along line X-X in FIG. 1.

In FIG. 1 to FIG. 5, the terminal-equipped electric wire according to the present embodiment is denoted by 1. This terminal-equipped electric wire 1 includes an electric wire 10 and a terminal fitting 20 that are connected physically and electrically to each other. In the terminal-equipped electric wire 1, the terminal fitting 20 is attached to an end 10*a* of the electric wire 10 (hereinafter referred to as "electric wire end"). Moreover, the terminal-equipped electric wire 1 includes a water-stopping member 30 in order to increase the anticorrosion performance of a connection part between the electric wire end 10*a* and the terminal fitting 20 (FIG. 1 and FIG. 2).

In this terminal-equipped electric wire 1, the terminal fitting 20 is connected to at least one of two electric wire ends 10*a* of the electric wire 10. In this terminal-equipped electric wire 1, the terminal fitting 20 may be connected to one electric wire 10, or a plurality of the electric wires 10 may be connected by at least one terminal fitting 20 and through this terminal fitting 20, the electric wires 10 may be electrically connected to each other. For example, the terminal fitting 20 is engaged with and connected to a counterpart terminal connection body of a counterpart terminal fitting so as to be physically and electrically connected to the counterpart terminal connection body, or is fixed with a screw to the counterpart terminal connection body so as to be physically and electrically connected to the counterpart terminal connection body. In a case of forming the terminal fitting 20 as a joint terminal that electrically connects the electric wires 10, the terminal fitting 20 may physically and electrically connect the electric wires 10 so as to electrically connect all the electric wires 10 through the terminal fitting 20 itself, or at least two of the electric wires 10 may be combined as one set and the terminal fitting 20 may be provided for each set as a joint terminal to physically and electrically connect each set. In the terminal-equipped electric wire 1 described here, one terminal fitting 20 that is engaged with and connected to the counterpart terminal connection body (not illustrated) is connected to the electric wire end 10*a* of one electric wire 10.

The electric wire 10 includes a core wire 11 and a cover 12 that covers the core wire 11. At the electric wire end 10*a*, the cover 12 is removed to expose the core wire 11 (FIG. 1 to FIG. 5). The core wire 11 is formed by a bundle of a plurality of element wires 13 made of a conductive metal wire material. The element wire 13 is molded of, for example, aluminum, aluminum alloy, copper, or copper alloy. The cover 12 is molded of an insulating resin material covering the core wire 11 while exposing a core wire exposed part 11*a* of the core wire 11 at the electric wire end 10*a*.

The terminal fitting 20 is molded of a conductive material such as metal (for example, aluminum, aluminum alloy, copper, or copper alloy). This terminal fitting 20 is molded into a predetermined shape by press-molding such as a bending process or a cutting process on a metal plate that is a base material.

This terminal fitting 20 includes a terminal connection body 21 to be electrically connected to the counterpart terminal connection body of the counterpart terminal fitting (FIG. 1 to FIG. 6). For example, one of the terminal connection body 21 and the counterpart terminal connection body is formed to have a female terminal shape and the other is formed to have a male terminal shape. The terminal connection body 21 and the counterpart terminal connection body are physically and electrically connected to each other as they are engaged with each other by insertion. In this example, the terminal connection body 21 is formed as a female terminal with a square tubular box shape, and the counterpart terminal connection body is formed as a male terminal with a male tab shape.

This terminal fitting 20 includes a bottom wall 22 on which the electric wire end 10*a* is placed in the state as the terminal-equipped electric wire 1 (FIG. 1 to FIG. 6). This terminal fitting 20 includes a pair of core wire caulking pieces 23 and 23 (FIG. 1 to FIG. 6) that rises from the bottom wall 22 and caulks and crimps the core wire exposed part 11*a* together with the bottom wall 22 while a front end 11*b* of the core wire exposed part 11*a* protrudes, and a pair of cover caulking pieces 24 and 24 (FIG. 1, FIG. 3, FIG. 4, and FIG. 6) that rises from the bottom wall 22 and caulks and crimps a cover end part 12*a* of the cover 12 at the electric wire end 10*a* together with the bottom wall 22. The terminal connection body 21 is provided on the front end 11*b* side of the core wire exposed part 11*a*. The terminal fitting 20 additionally includes a pair of side walls (hereinafter referred to as "first side walls") 25 and 25 (FIG. 1 to FIG. 6) that rises from the bottom wall 22 for the respective core wire caulking pieces 23 and 23, is coupled to the bottom wall 22 side of the core wire caulking pieces 23 and 23, and exposes the front end 11*b* of the core wire exposed part 11*a* from an opening 25*a* between the respective end parts. This terminal fitting 20 moreover includes a pair of side walls (hereinafter referred to as "second side walls") 26 and 26 (FIG. 1, FIG. 3, FIG. 4, and FIG. 6) that rises from the bottom wall 22 for the respective core wire caulking pieces 23 and 23, couples the bottom wall 22 side of the core wire caulking pieces 23 and 23 to the bottom wall 22 side of the cover caulking pieces 24 and 24, and exposes the electric wire end 10*a* from an opening 26*a* between the respective end parts between the pair of core wire caulking pieces 23 and 23 and the pair of cover caulking pieces 24 and 24.

The bottom wall 22 includes a first bottom part 22*a* from which the pair of core wire caulking pieces 23 and 23, the pair of cover caulking pieces 24 and 24, the pair of first side walls 25 and 25, and the pair of second side walls 26 and 26 rise, and a second bottom part 22*b* constituting a part of a wall part of the terminal connection body 21 and continuing to the first bottom part 22*a* (FIG. 1 to FIG. 6). That is to say, the bottom wall 22 includes the first bottom part 22*a* on which the electric wire end 10*a* is placed, and the second bottom part 22*b* constituting a part of the wall part of the terminal connection body 21. In this bottom wall 22, for example, both the first bottom part 22*a* and the second bottom part 22*b* are formed to have a flat plate shape or an arc shape, or one of the first bottom part 22*a* and the second bottom part 22*b* is formed to have a flat plate shape and the other is formed to have an arc shape. In the bottom wall 22 described here, both the first bottom part 22*a* and the second bottom part 22*b* are formed to have a flat plate shape.

Figure 3:
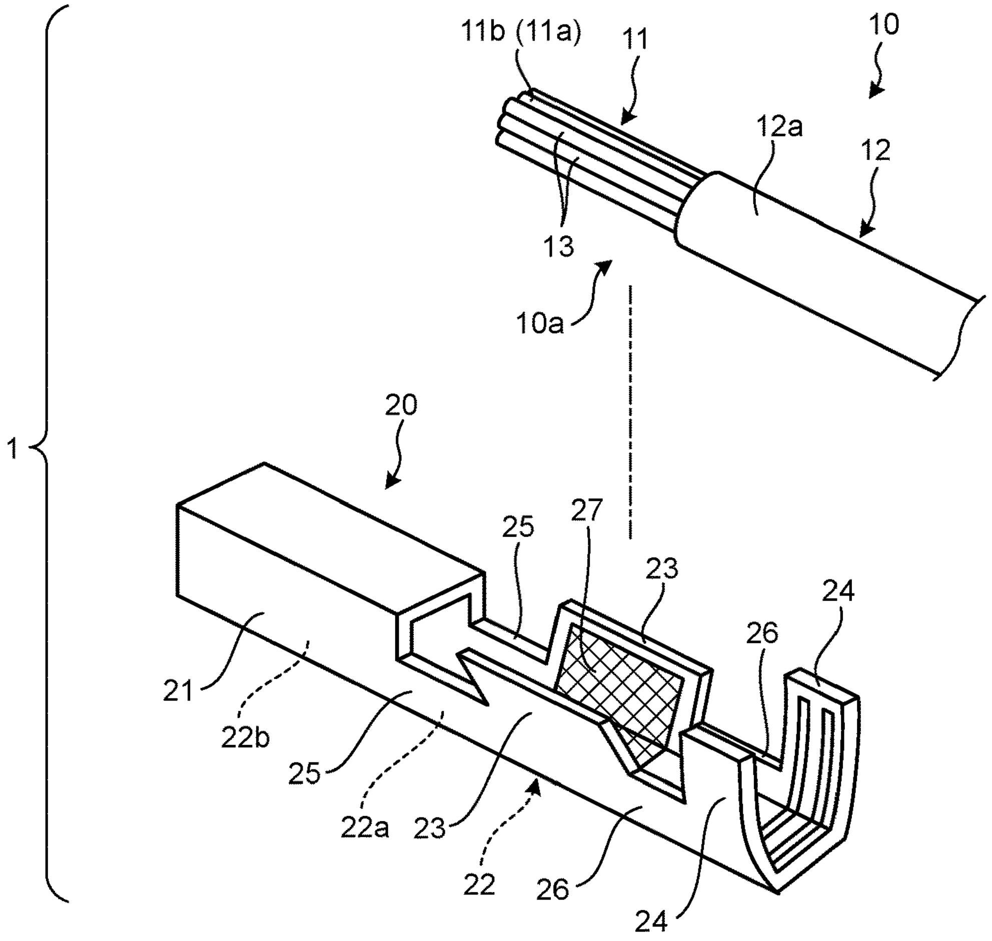
FIG. 3 is an exploded perspective diagram illustrating the terminal-equipped electric wire according to the embodiment (excluding a water-stopping member)

Each of the pair of core wire caulking pieces 23 and 23 is a piece body protruding from both ends in a direction orthogonal to the axial direction of the electric wire end 10*a* at the first bottom part 22*a* on which the electric wire end 10*a* is placed (FIG. 1, FIG. 3, FIG. 4, and FIG. 6). In this terminal fitting 20, for example, the pair of core wire caulking pieces 23 and 23 protrudes in a direction intersecting with the wall surface of the first bottom part 22*a* and is disposed to face each other with a space therebetween, so that the first bottom part 22*a* and the pair of core wire caulking pieces 23 and 23 form a U-shape (FIG. 3). In this terminal fitting 20, the core wire exposed part 11*a* of the electric wire end 10*a* is placed on the first bottom part 22*a* serving as a bottom of the U-shape and pressure is applied to the core wire exposed part 11*a* while the pair of core wire caulking pieces 23 and 23 is wound around the core wire exposed part 11*a*, and thus, the core wire exposed part 11*a* is caulked and crimped. Therefore, the core wire exposed part 11*a* is physically and electrically connected to the first bottom part 22*a* and the pair of core wire caulking pieces 23 and 23.

Figure 4:
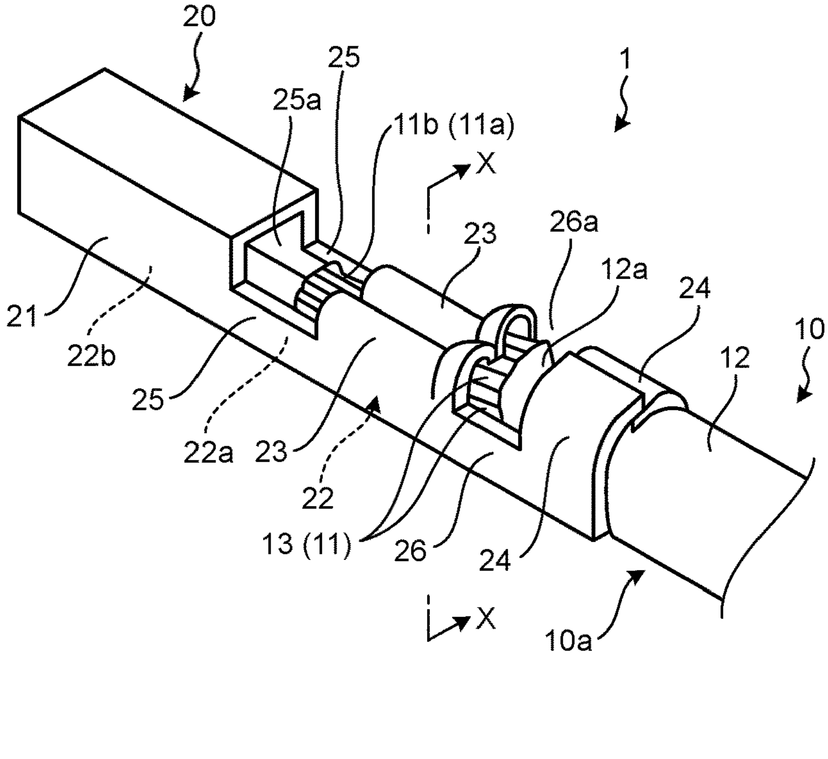
FIG. 4 is a perspective diagram illustrating the terminal-equipped electric wire according to the embodiment (excluding the water-stopping member)

While the core wire exposed part 11*a* is caulked and crimped by the pair of core wire caulking pieces 23 and 23 described here, the front end 11*b* of the core wire exposed part 11*a* protrudes toward the pair of first side walls 25 and 25 and a rear end of the core wire exposed part 11*a* (end part on the cover 12 side) protrudes toward the pair of second side walls 26 and 26 (FIG. 1 and FIG. 4).

Figure 6:
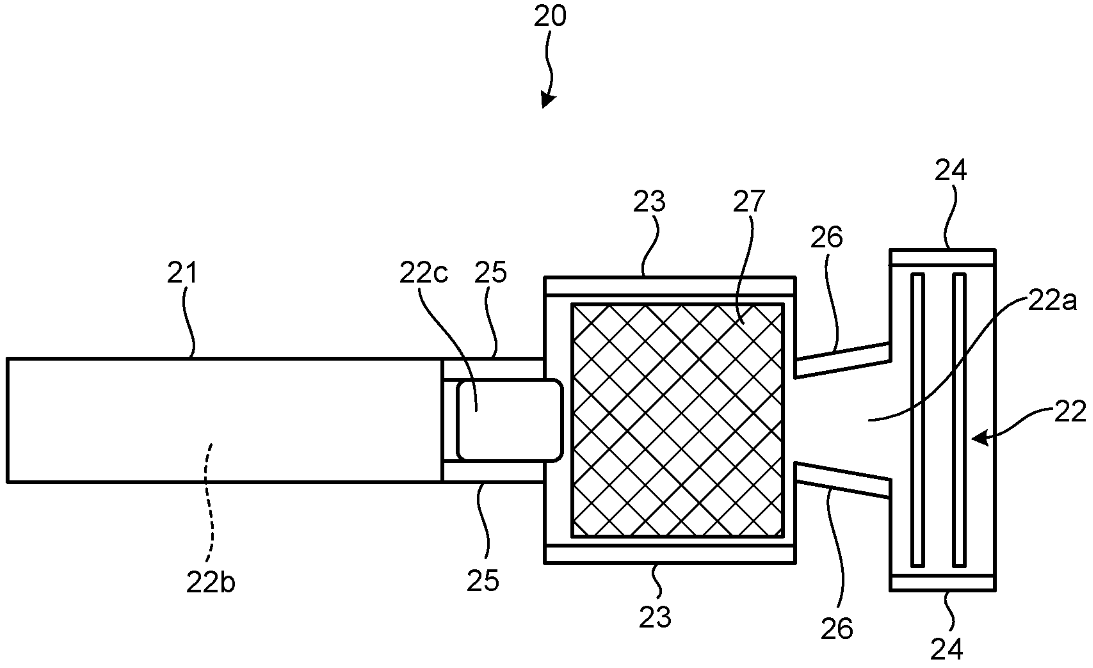
FIG. 6 is a plan diagram illustrating the terminal fitting before the electric wire end is attached, which is viewed from an inner wall surface side.
Figure 7:
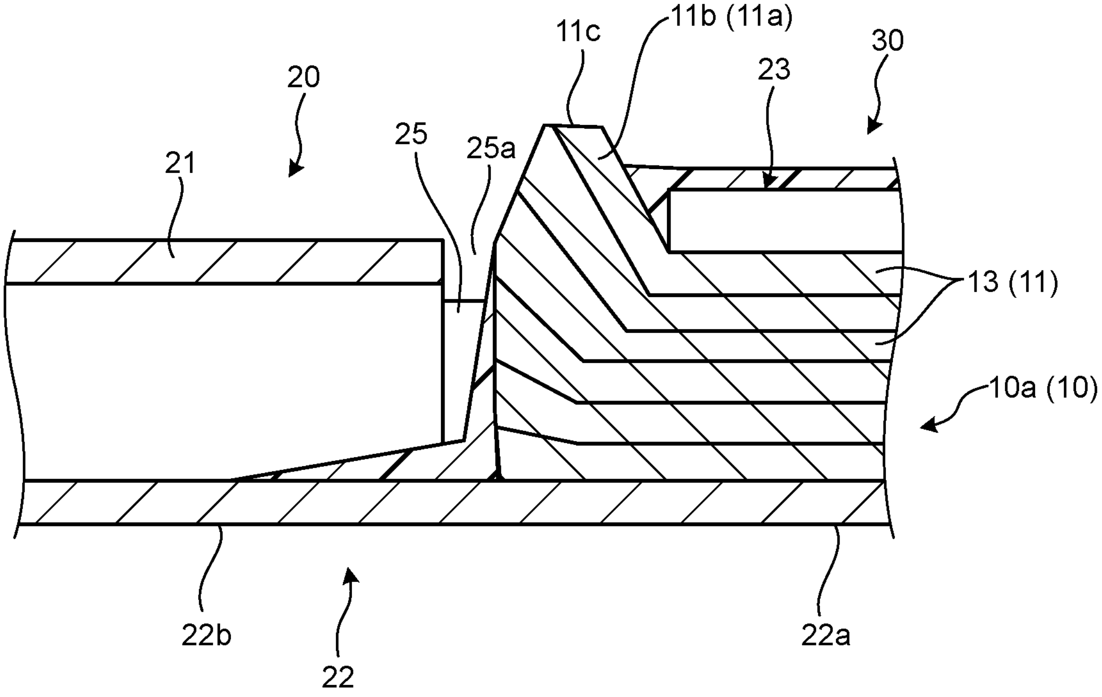
FIG. 7 is an explanatory diagram of a conventional terminal-equipped electric wire corresponding to the cross section taken along line X-X in FIG. 1.

In the terminal fitting 20 described here, a serration region 27 including at least one of a plurality of concave parts and a plurality of convex parts is formed on an inner wall surface ranging from one core wire caulking piece 23 to the other core wire caulking piece 23 (FIG. 3 and FIG. 6). In the first bottom part 22*a* and the pair of core wire caulking pieces 23 and 23, the contact area with the core wire exposed part 11*a* is increased in the serration region 27, so that the adhesion strength therebetween is increased to improve the contact reliability, and thus, the electric connection state therebetween is improved. This serration region 27 is formed at a place avoiding a concave part 22*c* of the first bottom part 22*a*, which is described below.

Each of the pair of cover caulking pieces 24 and 24 is a piece body that, at the first bottom part 22*a* where the electric wire end 10*a* is placed, protrudes from both ends in the direction orthogonal to the axial direction of the electric wire end 10*a* (FIG. 1, FIG. 3, FIG. 4, and FIG. 6). In this terminal fitting 20, for example, the pair of cover caulking pieces 24 and 24 protrudes in the direction intersecting with the wall surface of the first bottom part 22*a* and is disposed to face each other with a space therebetween; thus, the first bottom part 22*a* and the pair of cover caulking pieces 24 and 24 form a U-shape (FIG. 3). In this terminal fitting 20, the cover end part 12*a* of the electric wire end 10*a* is placed on the first bottom part 22*a*, which constitutes the bottom of the U-shape, and pressure is applied to the cover end part 12*a* while the pair of cover caulking pieces 24 and 24 is wound around this cover end part 12*a* and thus, the cover end part 12*a* is caulked and crimped.

While the cover end part 12*a* is caulked and crimped by the pair of cover caulking pieces 24 and 24, a front end of the cover end part 12*a* (end part on the core wire exposed part 11*a* side) protrudes toward the pair of second side walls 26 and 26 (FIG. 1 and FIG. 4). In this terminal fitting 20, the electric wire 10 is extracted out of the pair of cover caulking pieces 24 and 24.

Each of the pair of first side walls 25 and 25 is a piece body that, at the first bottom part 22*a* where the electric wire end 10*a* is placed, protrudes from both ends in the direction orthogonal to the axial direction of the electric wire end 10*a* (FIG. 1, FIG. 3, FIG. 4, and FIG. 6). The pair of first side walls 25 and 25 protrudes in the direction intersecting with the wall surface of the first bottom part 22*a* and is disposed to face each other with a space therebetween. One of the pair of first side walls 25 and 25 is coupled to the first bottom part 22*a* side of one core wire caulking piece 23, and the other first side wall 25 is coupled to the first bottom part 22*a* side of the other core wire caulking piece 23. Moreover, the terminal connection body 21 is coupled to the pair of first side walls 25 and 25 on the side opposite to the pair of core wire caulking pieces 23 and 23.

In the terminal fitting 20, between the end parts of the pair of first side walls 25 and 25 in the protruding direction and between the terminal connection body 21 and the pair of core wire caulking pieces 23 and 23, the opening 25*a* for exposing the front end 11*b* of the core wire exposed part 11*a* is formed (FIG. 1, FIG. 2, FIG. 4, and FIG. 5).

Each of the pair of second side walls 26 and 26 is a piece body that, at the first bottom part 22*a* where the electric wire end 10*a* is placed, protrudes from both ends in the direction orthogonal to the axial direction of the electric wire end 10*a* (FIG. 1, FIG. 3, FIG. 4, and FIG. 6). The pair of second side walls 26 and 26 protrudes in the direction intersecting with the wall surface of the first bottom part 22*a* and is disposed to face each other with a space therebetween. One of the pair of second side walls 26 and 26 is coupled to the first bottom part 22*a* side of one core wire caulking piece 23 and to the first bottom part 22*a* side of one cover caulking piece 24, and the other second side wall 26 is coupled to the first bottom part 22*a* side of the other core wire caulking piece 23 and to the first bottom part 22*a* side of the other cover caulking piece 24.

In the terminal fitting 20, between the end parts of the pair of second side walls 26 and 26 in the protruding direction and between the pair of core wire caulking pieces 23 and 23 and the pair of cover caulking pieces 24 and 24, the opening 26*a* for exposing the electric wire end 10*a* is formed (FIG. 1 and FIG. 4). The opening 26*a* described here exposes the rear end of the core wire exposed part 11*a* (end part on the cover 12 side) at the electric wire end 10*a* and the front end of the cover end part 12*a* (end part on the core wire exposed part 11*a* side).

Figure 5:
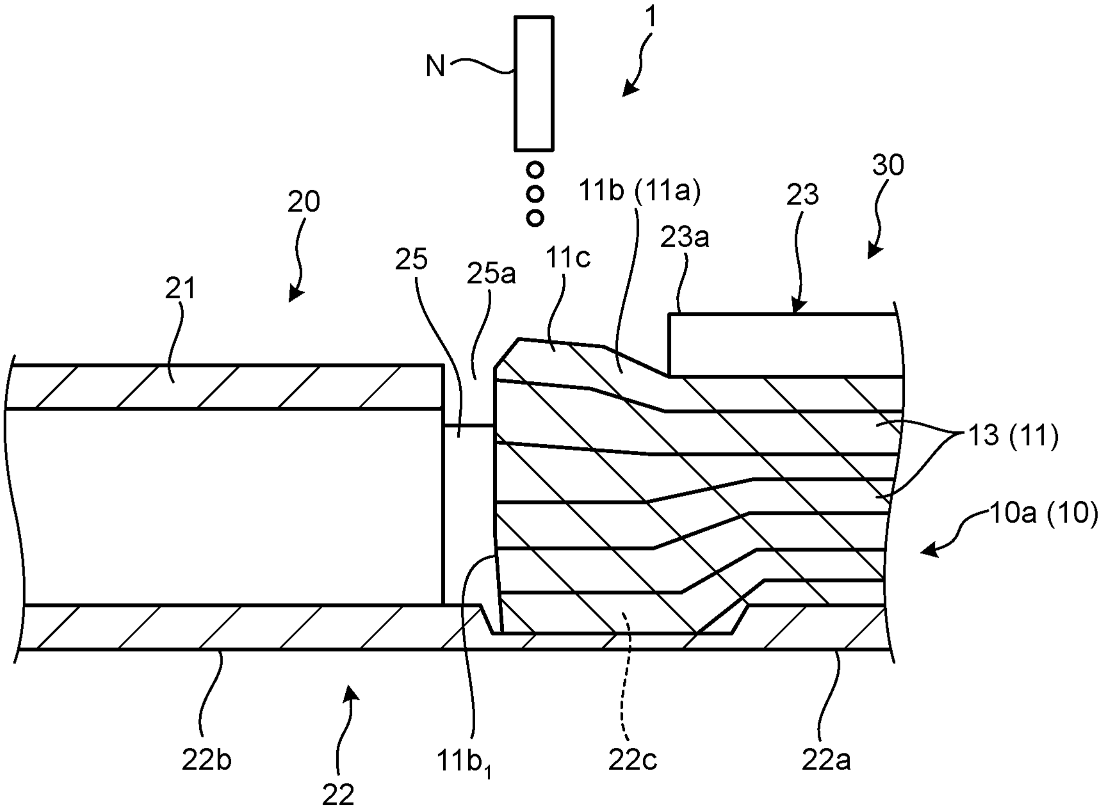
FIG. 5 is a partial magnified diagram of a cross section taken along line X-X in FIG. 4.

Here, the bottom wall 22 of the terminal fitting 20 includes the concave part 22*c* that continues from a place facing end parts 23*a* of the pair of core wire caulking pieces 23 and 23 on the first side walls 25 and 25 side (that is, on the front end 11*b* side of the core wire exposed part 11*a*) to a front end surface $\mathbf{11}b_1$ of the front end 11*b* of the core wire exposed part 11*a*. The concave part 22*c* receives the bottom wall 22 in the range of the place where the core wire exposed part 11*a* is caulked and crimped by the end parts 23*a* of the pair of core wire caulking pieces 23 and 23 to the front end surface $\mathbf{11}b_1$ (FIG. 2, FIG. 5, and FIG. 6). This concave part 22*c* is formed in the first bottom part 22*a*.

The concave part 22*c* described here is depressed in a rectangular shape from one first side wall 25 to the other first side wall 25 in the concave part formation target range from the place facing the end parts 23*a* of the pair of core wire caulking pieces 23 and 23 on an inner wall surface of the first bottom part 22*a* to the tip of the front end surface $\mathbf{11}b_1$ of the core wire exposed part 11*a* (FIG. 6).

In the terminal-equipped electric wire 1, when the core wire exposed part 11*a* is caulked and crimped by the pair of core wire caulking pieces 23 and 23, the core wire exposed part 11*a* enters the concave part 22*c* with the crimping force from this pair of core wire caulking pieces 23 and 23. The concave part 22*c* is formed with the size that can form the space from the front end surface $\mathbf{11}b_1$ in the state where the core wire exposed part 11*a* is inside in order to make the concavity continue to the tip of the front end surface $\mathbf{11}b_1$ of the core wire exposed part 11*a* (FIG. 2 and FIG. 5).

In the terminal-equipped electric wire 1, the crimping force from the pair of core wire caulking pieces 23 and 23 and the first bottom part 22*a* of the bottom wall 22 after the caulking and crimping acts on the core wire exposed part 11*a* and therefore, the force in the direction opposite to the direction of the crimping force from the pair of core wire caulking pieces 23 and 23 acts on the front end 11*b* of the core wire exposed part 11*a* supported on the first bottom part 22*a* side. Accordingly, the front end 11*b* of the core wire exposed part 11*a* jumps up in the direction of the opposite force. In the terminal-equipped electric wire 1, however, the core wire exposed part 11*a* enters the concave part 22*c* on the first bottom part 22*a* side and thus, the jumping of a jumping part 11*c* of the front end 11*b* of the core wire exposed part 11*a* can be suppressed to be a small quantity (FIG. 2 and FIG. 5).

The water-stopping member 30 covers the exposed part of the electric wire end 10*a* in the terminal fitting 20 from the outside together with the terminal fitting 20 (FIG. 1). Thus, the water-stopping member 30 suppresses the entry of the liquid to the connection part between the electric wire end 10*a* and the terminal fitting 20.

This water-stopping member 30 is formed of a curable resin material and is formed by curing a curable resin material in a liquid form with fluidity. This water-stopping member 30 is formed in a manner that the electric wire end 10*a* and the terminal fitting 20 are caulked and crimped, the curable resin material in the liquid form is applied to the exposed part of the electric wire end 10*a* in the terminal fitting 20 and its periphery from a nozzle N, and this curable resin material is cured (FIG. 1, FIG. 2, FIG. 4, and FIG. 5). Here, the curable resin material in the liquid form is applied to the openings 25*a* and 26*a*, the pair of core wire caulking pieces 23 and 23, and the pair of cover caulking pieces 24 and 24 in order to cover up the electric wire end 10*a* exposed from the openings 25*a* and 26*a* (the front end 11*b* and rear end of the core wire exposed part 11*a*, and the front end of the cover end part 12*a*).

In this terminal-equipped electric wire 1, as described above, the jumping of the jumping part 11*c* of the front end 11*b* of the core wire exposed part 11*a* is suppressed to be a small quantity. Thus, compared to the conventional terminal-equipped electric wire in which the jumping of the front end of the core wire exposed part is not suppressed (FIG. 7), when the curable resin material in the liquid form is applied to the front end 11*b* of the core wire exposed part 11*a* of the terminal-equipped electric wire 1 through the opening 25*a*, this curable resin material in the liquid form can be left with thickness at the front end 11*b* of the core wire exposed part 11*a*. In this terminal-equipped electric wire 1, the curable resin material in the liquid form can be cured with thickness at the front end 11*b* of the core wire exposed part 11*a* (except shrinkage by curing). Thus, compared to the water-stopping member of the conventional terminal-equipped electric wire, the difference in thickness between the part covering the front end 11*b* of the core wire exposed part 11*a* and the part covering the other part is small and the necessary and sufficient thickness is secured entirely in the cured water-stopping member 30. Therefore, for example, the cause of decreasing the durability due to the influence of the pressure change in the jumping part at the front end of the core wire exposed part in the conventional water-stopping member is reduced largely. Accordingly, the terminal-equipped electric wire 1 according to the present embodiment includes the water-stopping member 30 with higher durability than the conventional terminal-equipped electric wire, and thus, the anticorrosion performance with excellent durability can be achieved. For example, this terminal-equipped electric wire 1 is useful and can effectively suppress the occurrence of galvanic corrosion when the core wire 11 and the terminal fitting 20 are formed of metal materials with different ionization tendencies like when the element wire 13 is formed of aluminum or aluminum alloy and the terminal fitting 20 is formed of copper or copper alloy. Note that FIG. 7 employs the same reference symbols as those of the terminal-equipped electric wire 1 according to the present embodiment for the convenience of the illustration.

In the conventional terminal-equipped electric wire, in order to form the water-stopping member with the suitable thickness also on the jumping part of the front end of the core wire exposed part, some kind of devise is necessary in the step of applying the curable resin material, for example, the amount of applying the curable resin material in the liquid form on the front end of the core wire exposed part is increased. In the terminal-equipped electric wire 1 according to the present embodiment, however, even if the curable resin material in the liquid form is applied with a constant application quantity while moving the nozzle N at a constant speed from the pair of cover caulking pieces 24 and 24 to the opening 25*a*, the water-stopping member 30 with the proper thickness whose difference from the periphery is small is formed at the front end 11*b* of the core wire exposed part 11*a*. Therefore, the terminal-equipped electric wire 1 can simplify the step of applying the curable resin material.

Furthermore, in the terminal-equipped electric wire 1 according to the present embodiment, the jumping of the jumping part 11*c* of the front end 11*b* of the core wire exposed part 11*a* is suppressed to be a small quantity compared to the conventional terminal-equipped electric wire; therefore, it is easy to predict the flowing status of the curable resin material in the liquid form applied from the opening 25*a* and the settling status of the flow. Thus, also from this perspective, the terminal-equipped electric wire 1 can simplify the step of applying the curable resin material.

As described above, the concave part 22*c* is formed with the size that can form the space from the front end surface 11*b*, of the core wire exposed part 11*a*. Therefore, in the terminal-equipped electric wire 1 according to the present embodiment, before the curable resin material in the liquid form is applied, the presence or absence of the space is checked visually from the opening 25*a* or by an imaging device, and whether the protruding quantity of the front end 11*b* of the core wire exposed part 11*a* from the pair of core wire caulking pieces 23 and 23 is proper can be determined easily.

Moreover, in the terminal-equipped electric wire 1 according to the present embodiment, by the space from the front end surface 11*b*, of the core wire exposed part 11*a* at the concave part 22*c*, the applied curable resin material in the liquid form can be kept in the space; thus, the entry of the curable resin material in the liquid form into the terminal connection body 21 (second bottom part 22*b*) can be suppressed. Therefore, the terminal-equipped electric wire 1 can suppress the decrease in electric conduction quality with the counterpart terminal connection body due to the water-stopping member in the terminal connection body 21.

In the terminal-equipped electric wire according to the present embodiment, the crimping force acts on the core wire exposed part from the pair of core wire caulking pieces and the bottom wall after the caulking and crimping. Therefore, the force in the direction opposite to the direction of the crimping force from the pair of core wire caulking pieces acts on the front end of the core wire exposed part supported on the bottom wall side. Accordingly, the front end of the core wire exposed part jumps up in the direction of the opposite force. In the terminal-equipped electric wire, however, the core wire exposed part enters the concave part on the bottom wall side; thus, the jumping of the jumping part of the front end of the core wire exposed part is suppressed to be a small quantity. Therefore, compared to the conventional terminal-equipped electric wire in which the jumping of the front end of the core wire exposed part is not suppressed, when the curable resin material in the liquid form is applied to the front end of the core wire exposed part of the terminal-equipped electric wire through the opening, this curable resin material in the liquid form can be left with thickness at the front end of the core wire exposed part. Moreover, in this terminal-equipped electric wire, the curable resin material in the liquid form can be cured with thickness at the front end of the core wire exposed part. Thus, compared to the water-stopping member of the conventional terminal-equipped electric wire, the difference in thickness between the part covering the front end of the core wire exposed part and the part covering the other part is small and the necessary and sufficient thickness is secured entirely in the cured water-stopping member. Therefore, for example, the cause of decreasing the durability due to the influence of the pressure change in the jumping part at the front end of the core wire exposed part in the conventional water-stopping member is reduced largely. Accordingly, the terminal-equipped electric wire according to the present embodiment includes the water-stopping member with higher durability than the conventional terminal-equipped electric wire, and thus, the anticorrosion performance with excellent durability can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-equipped electric wire comprising:

an electric wire including a core wire formed of a plurality of element wires, and a cover that covers the core wire while exposing a core wire exposed part of the core wire at an electric wire end;

a terminal fitting attached to the electric wire end; and a water-stopping member formed of a curable resin material and covering an exposed part of the electric wire end in the terminal fitting from outside together with the terminal fitting so as to suppress entry of liquid to a connection part between the electric wire end and the terminal fitting, wherein the terminal fitting includes a bottom wall on which the electric wire end is placed, and a pair of core wire caulking pieces rising from the bottom wall and caulking and crimping the core wire exposed part together with the bottom wall in a state where a front end of the core wire exposed part protrudes, and the bottom wall includes a concave part that continues from a place facing end parts of the pair of core wire caulking pieces on the front end side of the core wire exposed part to a front end surface of the front end of the core wire exposed part, and receives the bottom wall side ranging from a place at which the core wire exposed part is caulked and crimped by the end parts of the pair of core wire caulking pieces to the front end surface.

2. The terminal-equipped electric wire according to claim 1, wherein the terminal fitting includes a terminal connection body provided at the front end side of the core wire exposed part and electrically connected to a counterpart terminal connection body, and the bottom wall includes a first bottom part including the concave part, the pair of core wire caulking pieces rising from the first bottom part, and a second bottom part constituting a part of a wall part of the terminal connection body and continuing to the first bottom part.

3. The terminal-equipped electric wire according to claim 1, wherein the terminal fitting includes a terminal connection body provided on the front end side of the core wire exposed part and electrically connected to a counterpart terminal connection body, and a pair of cover caulking pieces rising from the bottom wall and caulking and crimping a cover end part of the cover at the electric wire end together with the bottom wall, and the bottom wall includes a first bottom part including the concave part, the pair of core wire caulking pieces and the pair of cover caulking pieces rising from the first bottom part, and a second bottom part constituting a part of a wall part of the terminal connection body and continuing to the first bottom part.

4. The terminal-equipped electric wire according to claim 1 wherein the concave part is depressed in a rectangular shape from one first side wall to an other first side wall.

* * * * *